US012791101B1

(12) United States Patent
Al-Khateeb et al.

(10) Patent No.: US 12,791,101 B1

(45) Date of Patent: Nov. 10, 2026

(54) AUTONOMOUS SEAL GAS CONTROL VIA SPEED AND POSITION

(71) Applicant: SAUDI ARABIAN OIL COMPANY, Dhahran (SA)

(72) Inventors: Eyad Mohammad Al-Khateeb, Dhahran (SA); Hamad Khaled Al-Ruzihi, Dammam (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 19/255,972

(22) Filed: Jun. 30, 2025

(51) Int. Cl.
*F16J 15/447* (2006.01)

(52) U.S. Cl.
CPC ................................ *F16J 15/4476* (2013.01)

(58) Field of Classification Search
CPC ..... F16J 15/447; F16J 15/4472; F16J 15/4476
See application file for complete search history.

(56) References Cited

U.S. PATENT DOCUMENTS

| | | | | |
|---|---|---|---|---|
| 9,145,783 | B2 | 9/2015 | Delrahim et al. | |
| 9,790,952 | B2 | 10/2017 | Shamseldin et al. | |
| 10,030,666 | B2 * | 7/2018 | Devitt | F16J 15/40 |
| 11,815,491 | B2 | 11/2023 | Goldswain et al. | |
| 2014/0321972 | A1 | 10/2014 | Del Vescovo et al. | |
| 2024/0035915 | A1 | 2/2024 | Werdecker et al. | |

FOREIGN PATENT DOCUMENTS

| | | | |
|---|---|---|---|
| CN | 109578591 | B | 1/2020 |
| EP | 3376079 | B1 | 4/2024 |
| JP | 7222833 | B2 | 2/2023 |

OTHER PUBLICATIONS

Ding, Junhua et al., "Fault Diagnosis of Dry Gas Seal Operation Status Based on Acoustic Emission Monitoring"; Lubricants; vol. 12, Issue 2, Article 35; pp. 1-17; Feb. 2024 (17 pages).

Baker Hughes, "Smart Dry Gas Seal (DGS) Monitoring System for Centrifugal Compressors"; Oil & Gas University—2018 Resident Course, Final Project Report; pp. 1-42; 2018 (42 pages).

* cited by examiner

*Primary Examiner* — Gilbert Y Lee

(74) *Attorney, Agent, or Firm* — Osha Bergman Watanabe & Burton LLP

(57) ABSTRACT

Systems and methods to control a flow of a seal gas through a dry gas seal using a seal gas control system. The systems and methods adjust a flow of the seal gas through the dry gas seal based upon variables such as the operating diameter of the shaft, the operating diameter of the seal, the eccentricity of the shaft, and/or the eccentric gap between the shaft and seal at operating conditions.

14 Claims, 5 Drawing Sheets

AUTONOMOUS SEAL GAS CONTROL VIA SPEED AND POSITION

BACKGROUND

A dry gas seal is a type of mechanical face seal used in machinery such as compressors, particularly in applications like gas transmission and chemical processing. Dry gas seals operate without any liquid lubrication, relying on a small gap between two sealing surfaces and the pressure of a barrier gas to prevent leakage, essentially creating a "dry" seal between the rotating and stationary parts of the compressor. The dry seal is considered a non-contacting seal due to the tiny gap maintained by the gas pressure and specially designed grooves on the rotating seal face.

Most industrial machinery and equipment (pumps, compressors, turbines, etc.) are fitted with dry gas seals to control leakage and reduce greenhouse gas emissions. The function of the seal is more crucial in hydrocarbon applications to prevent leakage of hydrocarbon gas to the atmosphere. Maintaining a dry gas seal requires very delicate control of seal gas flow while considering different operating conditions (i.e., startup, shutdown, idle, etc.). Conventional design practice controls the seal gas to maintain constant seal gas flow or pressure regardless of the operation mode or operating speed of the machine. This practice does not ensure sufficient flow to protect the seal cavities and components from contamination by the sealed process gas. Accordingly, there exists a need for improved systems and methods for determining and adjusting seal gas flow.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method to control flow of a seal gas through a dry gas seal using a seal gas control system. The seal gas control system includes a rotating apparatus, a gas supply system, and a gas flow control system. The rotating apparatus includes a process labyrinth, having a labyrinth inner surface and a labyrinth inner radius, and a shaft, having a shaft outer surface and a shaft outer radius, disposed within the process labyrinth and configured to rotate within the process labyrinth at a shaft speed in a range from zero up to a maximum shaft speed. A first shaft position sensor is located proximate the shaft and is configured to measure a first shaft position. A second shaft position sensor is located proximate the shaft and is configured to measure a second shaft position. A shaft speed sensor is located proximate the shaft and is configured to measure the shaft speed. A gap, having a gap size, is defined by a radial distance between the labyrinth inner surface and the shaft outer surface. The gas supply system is fluidly connected to the rotating apparatus and is configured to provide the seal gas to the gap via a seal gas line. The gas flow control system comprises a flow control valve and a flow meter disposed on the seal gas line, wherein the flow meter is configured to measure a seal gas flow rate. The gas flow control system receives an operating seal gas flow rate from the flow meter, receives an operating shaft speed from the shaft speed sensor, receives a first operating shaft position from the first shaft position sensor and a second operating shaft position from the second shaft position sensor. The gas flow control system further determines an operating shaft position of the shaft within the process labyrinth from the first operating shaft position and the second operating shaft position at a point in time during operation of the rotating apparatus, and determines a desired seal gas flow rate as a function of the operating shaft position. Further, the method includes adjusting the operating seal gas flow rate to the desired seal gas flow rate using the flow control valve. Operation of the flow control valve may be performed automatically using the gas flow control system.

In another aspect, embodiments herein are directed toward a system to control a flow of a seal gas through a dry gas seal. The system includes a rotating apparatus, a gas supply system, a gas flow control system, and a computer system. The rotating apparatus comprises a process labyrinth, having a labyrinth inner surface and a labyrinth inner radius, and a shaft, having a shaft outer surface and a shaft outer radius, disposed within the process labyrinth and configured to rotate within the process labyrinth at a shaft speed. A first shaft position sensor is located proximate the shaft and is configured to measure a first shaft position. A second shaft position sensor is located proximate the shaft and is configured to measure a second shaft position, wherein the second shaft position sensor is disposed radially at a 90 degree angle from the first shaft position sensor. A shaft speed sensor is located proximate the shaft and is configured to measure the shaft speed. Further, there exists a gap, having a gap size, defined by a radial distance between the labyrinth inner surface and the shaft outer surface. The gas supply system is fluidly connected to the rotating apparatus and is configured to provide the seal gas to the gap via a seal gas line. The gas flow control system includes a flow control valve and a flow meter disposed on the seal gas line, wherein the flow meter is configured to measure a seal gas flow rate. The computer system is coupled to the at least one shaft position sensor, the shaft speed sensor, the gas supply system, and the gas flow control system. The computer system is configured to: receive an operating seal gas flow rate from the flow meter; receive an operating shaft speed from the shaft speed sensor; receive a first operating shaft position from the first shaft position sensor and a second operating shaft position from the second shaft position sensor; determine an operating shaft position of the shaft within the process labyrinth from the first operating shaft position and the second operating shaft position at a point in time during operation of the rotating apparatus; and determine a desired seal gas flow rate as a function of the operating shaft position. The computer system is further configured to adjust the operating seal gas flow rate to the desired seal gas flow rate using the flow control valve.

Other aspects and advantages of the claimed subject matter will be apparent from the following description and the appended claims.

DETAILED DESCRIPTION

Figure 1:
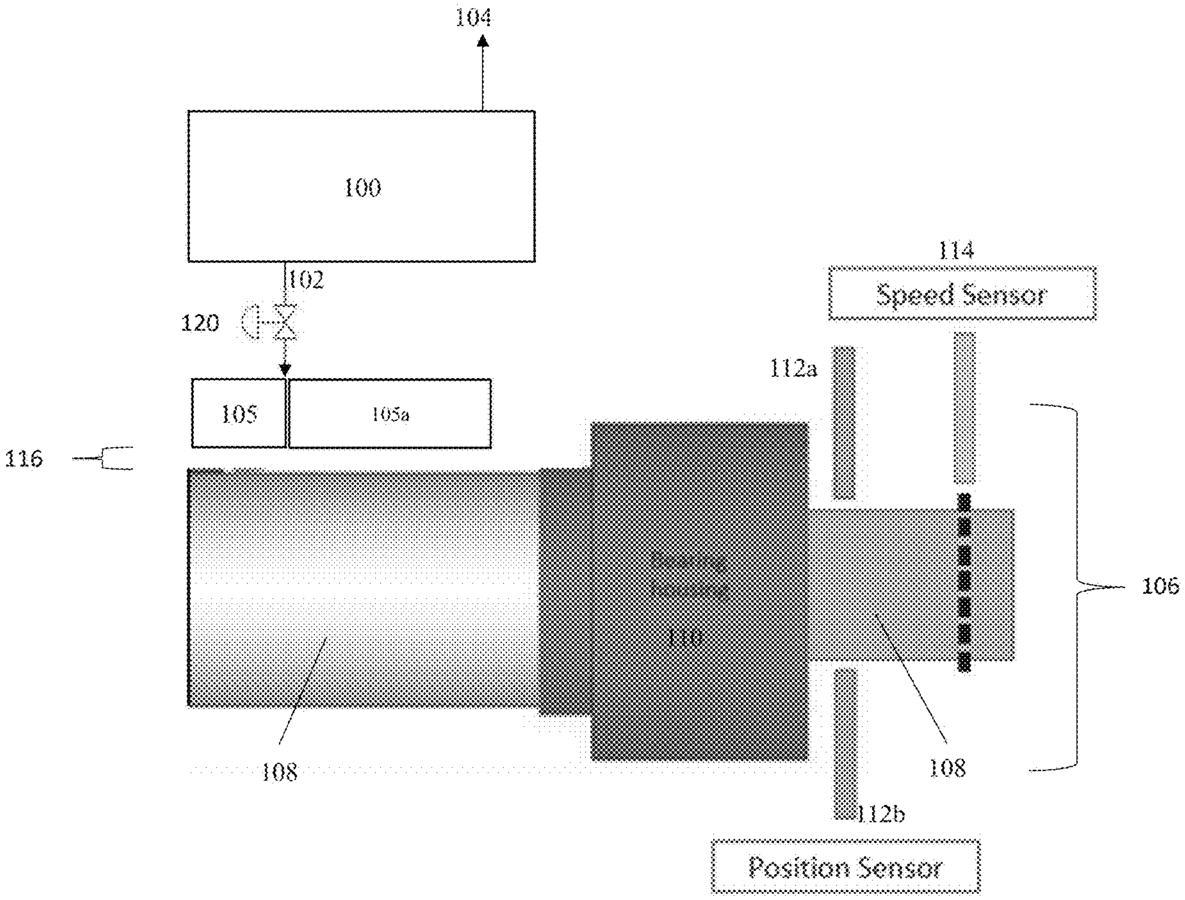
FIG. 1 illustrates a rotating device and gas supply system according to one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein generally relate to systems and methods for varying seal gas flow to create a gas seal within a rotating apparatus using real time feedback on rotor (shaft) position to identify the eccentric gap between a rotor journal and a process labyrinth seal. The identified eccentric gap may then be used to determine a required seal gas flow rate to ensure sufficient flow to fill the entire eccentric gap volume.

An eccentric gap is defined herein as the greatest difference between the rotor journal and the process labyrinth seal. The eccentric gap may result from misalignment or offset in rotating parts, causing off-center rotation. In addition, heat generated when a rotating component is in motion may also cause a small change in outer diameter of the rotating component and inner diameter of the labyrinth due to thermal expansion.

When a rotating apparatus is in a static state (e.g., when a rotating component—such as a shaft—of the rotating apparatus is not rotating), an outer shaft surface may be concentric to an inner labyrinth surface (also referred to as a "diametral clearance"), creating a constant gap between the two surfaces. Accordingly, a seal gas flowing into said constant gap will have a constant flow rate profile and a constant pressure drop profile circumferentially around the gap.

When the shaft is off center, an eccentric gap exists as described above. In the worst case scenario, the shaft has a maximum off center displacement leading to a maximum diametral clearance and therefore a maximum eccentric gap. Prior art methods generally assume the maximum eccentric gap to be equal to two times the diametral clearance. In this scenario, the seal gas flow rate profile and pressure drop profile circumferentially around the gap are not constant, requiring adjustment of the flow of seal gas to the gas seal in order to correct for the pressure drop and thus maintain a proper gas seal. Prior art methods typically take the worst case scenario into account in order to control the flow of seal gas by assuming twice the diametral clearance of the process labyrinth. This leads to excessive and unnecessary flow from the seal gas to be recycled.

However, during actual operation of a rotating apparatus, the radial position of the rotor will be somewhere in between the static condition (e.g., concentric with respect to the labyrinth) and the worst case scenario (e.g., having a maximum distance equal to two times the diametral clearance between the rotor and the labyrinth), leading to what will be referred to herein as an "operating eccentric gap." The operating eccentric gap results in a variable flow rate profile and a variable pressure drop profile circumferentially around the gap. Accordingly, the seal gas pressure drop at the operating eccentric gap has a value which is lower than the static condition but higher than the worst case scenario. Similarly, the seal gas velocity at the operating eccentric gap is lower than the static condition but higher than the worst case scenario.

In contrast to prior art methods, which provide excessive seal gas flow to the gas seal by assuming the maximum eccentric gap in the rotating apparatus system, systems and methods disclosed herein advantageously include the use of sensors to detect rotor position and speed, allowing for measurement of actual rotor position (and therefore a determination of the actual operating eccentric gap) during operation. Signals are sent from the sensors as continuous feedback to the distributed control system (DCS) which then determines the required seal gas flow rate to fill the operating eccentric gap and control the seal gas flow via a seal gas flow control valve.

Furthermore, systems and methods disclosed in one or more embodiments herein take the eccentricity and change in outer diameter of the rotating component and inner diameter of the labyrinth due to thermal expansion into account in order to more accurately calculate eccentric gap and therefore calculate a more accurate seal gas flow rate during operation. Restating, systems and methods herein adjust a seal gas flow rate based on the measured rotor position (eccentricity), measured speed, and thermal properties of the system components.

Turning now to the Figures, FIG. 1 shows a gas supply system 100 fluidly connected to a rotating apparatus 106 in accordance with one or more embodiments. The gas supply system 100 is configured to provide a seal gas to create a gas seal in the rotating apparatus 106. Specifically, the seal gas is provided to the rotating apparatus 106 via seal gas line 102. A gas flow control system, including a flow control valve 120, may be disposed on seal gas line 102 and configured to control a flow of seal gas to the rotating apparatus 106. The gas flow control system may include any other components known in the art without departing from the present disclosure. In one or more embodiments, the gas flow control system includes a flow meter (not shown in FIG. 1) configured to measure a gas flow rate of the seal gas. The gas supply system 100 may also have a gas vent 104. The gas vent 104 may be, for example, a safety valve configured to release pressure when a maximum gas pressure is exceeded in the system.

The gas supply system 100 according to one or more embodiments may be any suitable gas supply system known in the art capable of supplying a seal gas via seal gas line 102 to a rotating apparatus 106. For example, the gas supply system 100 may include a gas source, a gas filter to remove contaminants, one or more gas sensors (e.g., gas pressure sensor, gas temperature sensor, gas flow meters, etc.), a seal gas line 102, and a gas flow control system. The gas source may be any container that holds the seal gas 102 or it may be a gas source such as the exit of a gas purifier, a plant's export pipeline, the plant's fuel gas system, and/or the compressor discharge. The seal gas 102 may be any type of gas that is used in dry gas seals, such as nitrogen, carbon dioxide, etc. Suitable gas pressure sensors may be any type known in the art, for example a differential pressure sensor or gauge. Suitable gas temperature sensors may be any type known in the art, for example a thermocouple sensor or a semiconductor-based sensor. Suitable gas flow meters may be any type known in the art, for example a turbine flow meter, an ultrasonic flow meter, a Coriolis flow meter, a volumetric or mass flow meter, a velocity flow meter and a pressure differential meter, among others.

Returning to FIG. 1, the rotating apparatus 106 has a shaft 108 that is configured to rotate. The shaft 108 may have a circular cross section and may rotate to transmit power and motion from one part of the rotating apparatus 106 to another. A housing 110 houses the shaft 108, where the housing 110 may remain stationary (e.g., stator) as the shaft 108 rotates (e.g., rotor) within the housing 110. In one or more embodiments, the housing 110 may be made of one or more components that make up the external structure of the rotating apparatus 106. In accordance with other embodiments, the housing 110 may be itself located within the rotating apparatus 106 with a subsequent part (not pictured) surrounding the housing 110. The shaft 108 may extend through the housing 110 and may have portions located outside of the housing 110. Although not explicitly shown, other components may be included as part of the rotating apparatus, for example stationary and/or rotating rings may be located within the housing 110, without departing from the embodiments disclosed herein.

The rotating apparatus 106 depicted in FIG. 1 is shown for example purposes only and any type of equipment that requires a seal between two parts (the two parts being designed to be in relative motion with one another) may be used without departing from the scope of the present disclosure. For example, the rotating apparatus 106 may be a gas compressor or a fluid pump. Furthermore, there may be one or more sets of rotating/stationary parts within the rotating apparatus 106 that require a gas seal supplied by the seal gas without departing from the scope of the disclosure herein.

In some embodiments, a process labyrinth 105 located between the gas supply system and the shaft provides a tortuous path for the seal gas 102 to flow through. A process labyrinth 105 may be implemented in specific rotating apparatuses 106 and may be absent in other specific rotating apparatuses 106 without departing from the present disclosure. In addition to process labyrinth 105, embodiments herein may include, for example, a primary and/or secondary seal 105*a*.

In FIG. 1, a gap 116 exists between an outer surface of the shaft 108 and an inner surface of the process labyrinth 105, as will be shown in more detail in FIGS. 2A-D. The gap 116 may be very thin but exists so that the shaft is able to rotate within the housing 110 without being quickly worn down due to friction. Process fluid (not pictured) may escape the rotating apparatus 106 through said gap 116, where the process fluid may comprise any fluid (liquid, gas, slurry, or suspension) that is being moved through or acted upon by the rotating apparatus 106. The gap 116 is where a gas seal is created according to embodiments disclosed herein. Specifically, the seal gas, fed via gas inlet line 102, is pumped into the gap 116 from the gas supply system 100 at a pressure slightly above intake pressure such that the seal gas within the gap 116 prevents the majority or totality of the process fluid that is being taken in by the rotating apparatus 106 from leaking. The seal gas being pumped into the gap 116 of the rotating apparatus 106 from the gas supply system 100 is what creates a gas seal. In accordance with one or more embodiments, one or more pumps or compressors (not pictured) may be located along the seal gas line 102 or within the gas supply system 100 to pump the seal gas from the gas supply system 100 into the rotating apparatus 106 to create the gas seal.

Figure 2:
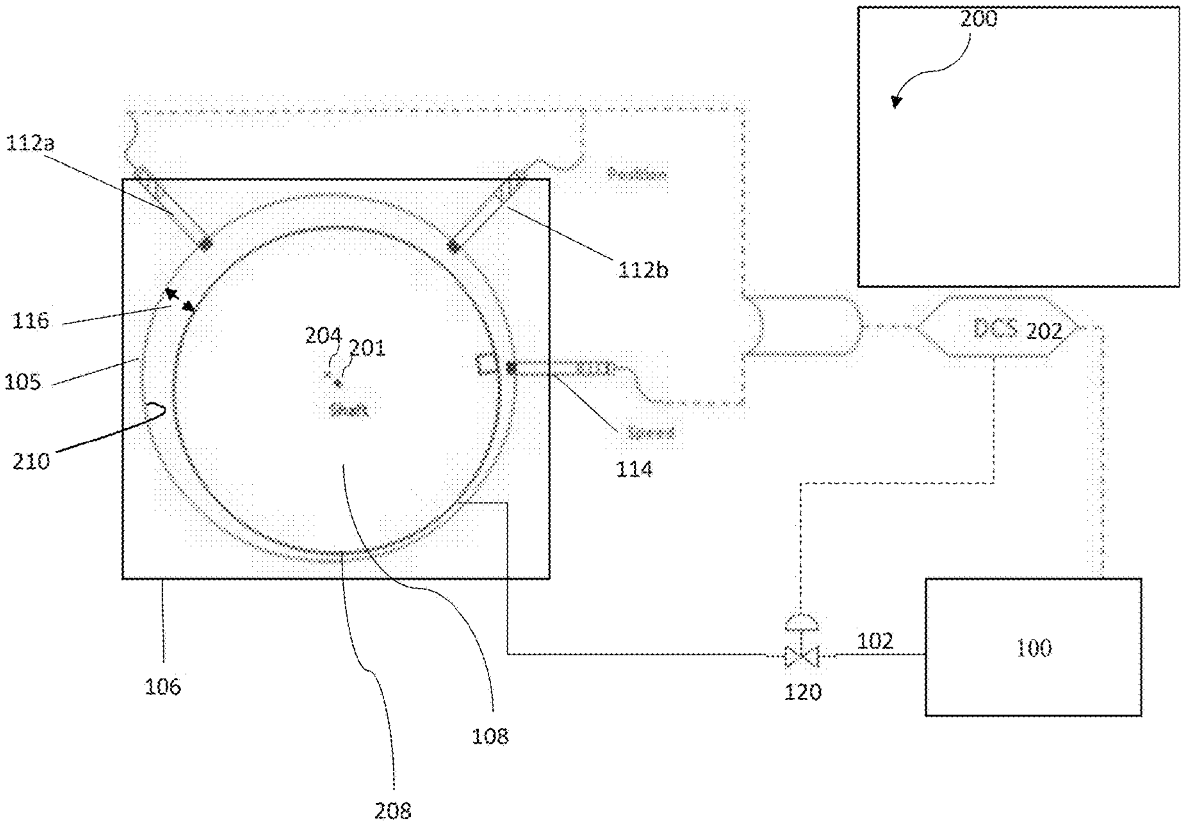
FIG. 2 illustrates a seal gas control system according to one or more embodiments.

The rotating apparatus according to one or more embodiments also includes one or more sensors located proximate shaft 108. The one or more sensors may include position sensors 112*a*, 112*b* and speed sensors 114 as shown in FIG. 1. The one or more sensors may also include a temperature sensor (not shown). In one or more embodiments a first position sensor 112*a* is located proximate shaft 108 and configured to measure a first shaft position. However, in preferred embodiments, both a first position sensor 112*a* and a second position sensor 112*b* are located proximate shaft 108 and configured to measure a first shaft position (relative to first position sensor 112*a*) and a second shaft position (relative to position sensor 112*b*), respectively. Proximate, as would be readily understood by one skilled in the art, refers to the sensor being located relative to the shaft such that the sensor may perform the intended reading, but located as to not interfere with or be interfered by the operation of the shaft. A radial angle exists between the first position sensor 112*a* and the second position sensor 112*b*, as best shown in FIG. 2. In some embodiments, the preferred radial angle between the first position sensor 112*a* and the second position sensor 112*b* is 90°. The speed sensor 114 may be located at any radial position around the shaft 108 and the positioning of the speed sensor 114 is not particularly important according to embodiments disclosed herein.

FIG. 2 shows a system 200 for seal gas control in accordance with one or more embodiments. In the system 200, the gas supply system 100 is electrically connected to a distributed control system (DCS) 202, as shown by dashed lines. The DCS 202 may be a computer processor, for example, the computer system 400 described in FIG. 4, below.

A simplified view of the rotating apparatus 106 is shown in FIG. 2. The rotating apparatus 106 includes a shaft 108 having a shaft outer surface 208. In the simplified view, the shaft 108 is located radially within the process labyrinth 105, where the process labyrinth has a labyrinth inner surface 210.

The rotating apparatus 106 shown in FIG. 2 may also be electrically connected to the DCS 202. Specifically, one or more sensors disposed proximate the rotating apparatus 106 may be configured to measure one or more parameters of the rotating apparatus 106 and provide (communicate) the one or more measured parameters (or signals representative of the one or more measured parameters) to the DCS 202.

The one or more sensors may include at least a first position sensor 112*a* and a speed sensor 114. The first position sensor 112*a* of one or more embodiments is configured to measure a first rotor position (a location of the rotor relative to the first position sensor). In one or more embodiments, a second position sensor 112*b* may also be disposed in the rotating apparatus 106. The second position sensor 112*b* is configured to measure a second rotor position (a location of the rotor relative to the second position sensor). As described above, the first position sensor 112*a* and the second position sensor 112*b* may be placed at a radial angle from one another. In some embodiments, the radial angle between the first position sensor 112*a* and the second position sensor 112*b* is preferably 90°. Placing the first position sensor 112*a* and the second position sensor 112*b* at a radial angle of 90° apart may advantageously allow for a more accurate radial position of the shaft 108 to be determined as compared to the use of only a first position sensor 112*a*.

The first position sensor 112*a* and the second position sensor 112*b* may be any suitable sensor known in the art capable of measuring a rotor position (measuring a distance between the sensor and the shaft outer surface 208). For example, the first position sensor 112*a* and the second position sensor 112*b* may be potentiometric, inductive, magnetostrictive, capacitive, magnetic (Hall Effect), fiber optic, optical, or ultrasonic type position sensors, the choice of which may depend upon the materials of construction of the shaft. During operation, the centerline 201 of the shaft 108, represented by '+', may be offset from the centerline 204 of the process labyrinth 105, represented by 'x'. The linear distance between shaft centerline 201 and labyrinth centerline 204 is calculated based on the location of the shaft centerline as determined using the one or more position sensors (112*a*, 112*b*, as illustrated).

The speed sensor 114 of one or more embodiments is configured to measure a rotor speed. The speed sensor 114 may be any suitable sensor known in the art capable of measuring a rotor speed. For example, the speed sensor 114 may be configured to measure a rotary speed of the shaft using optical sensors, magnetoresistive sensors, inductive sensors, variable reluctance magnetic sensors, or Hall Effect magnetic speed sensors.

A gas flow control system is also coupled to the DCS 202. The gas flow control system may include a flow control valve 120 and a flow meter (not shown). The DCS 202 may receive signals from the flow meter of the gas flow control system indicating an operating flow rate of seal gas 102 at a specific point in time. The DCS 202 may also send a signal to the gas flow control system to control (adjust) a flow rate of seal gas 102 flowing to the gap 116 by adjusting a position of the flow control valve 120.

The DCS 202 may also include instructions to calculate a flow rate of the seal gas 102 (e.g., a required seal gas flow rate) based on measured conditions (e.g., rotor position, rotor speed, eccentricity, operating temperature, etc.) according to methods disclosed in one or more embodiments herein. The DCS 202 may receive a rotor speed from the speed sensor 114. If the rotor speed received from the speed sensor is zero, the system is static. If, on the other hand, the rotor speed is greater than zero, the system is in operation (e.g., the shaft is rotating) and a gas flow rate of seal gas required to fill the gap 116 may be calculated.

In some embodiments, the rotor speed may also be used to determine the pressure in the seal chamber and the calculated position of the shaft centerline within the bearing. For example, the rotor speed can be used to determine the seal chamber pressure using the speed dependent compressor pressure curves. Likewise, the shaft centerline position can be estimated by using bearing curves (see below example) after measuring the speed to calculate the sommerfield number. In some embodiments, DCS 202 includes programming to interpolate or determine the seal chamber pressure and the shaft centerline positions, the programming including equations based on these relationships for a given pump system to calculate the respective values at operating conditions.

In one or more embodiments, the gas flow rate of seal gas required to fill the gap 116 during operation of the system is calculated using the measured rotor positions from the first position sensor 112*a* and the second position sensor 112*b*, as will be described in more detail in the following sections. The DCS 202 may also include instructions to control, or automatically control, a position of the flow control valve 120 to adjust an operating flow rate to the calculated flow rate of the seal gas 102 in real-time based on the measured conditions.

Methods for calculating a desired flow rate of seal gas during system operation will now be described with reference to FIGS. 3A-C.

Figure 3A:
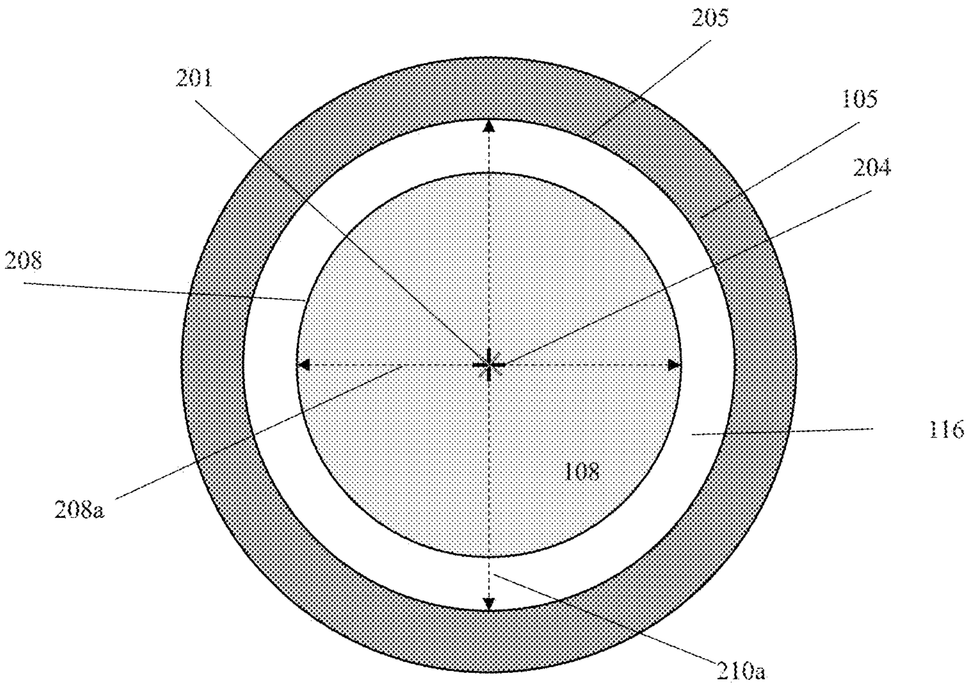
FIG. 3A is a front view of a static rotating device according to one or more embodiments.
Figure 3B:
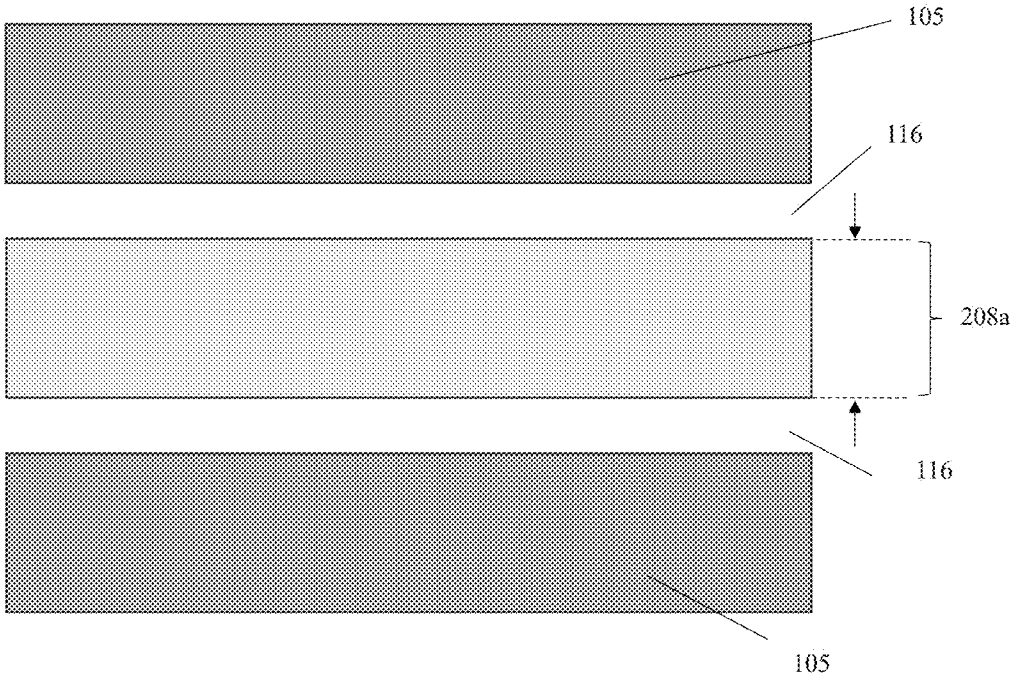
FIG. 3B is a side view of a static rotating device according to one or more embodiments.

Referring collectively to FIGS. 3A-B, FIGS. 3A-B show a front view and a side view, respectively, of a static rotating device according to one or more embodiments. In FIGS. 3A-B, a gap 116 is provided between the labyrinth inner surface 210 and the shaft outer surface 208, When the system is static, the gap (radial distance between the labyrinth inner surface 210 and the shaft outer surface 208) may be similar circumferentially around the shaft (the same, or approximately the same, depending upon manufacturing tolerances). Furthermore, the labyrinth has a known labyrinth inner diameter 210*a*, denoted as $d_{seal}$, (measured from labyrinth center 204) and the shaft has a known shaft outer diameter 208*a*, denoted as $d_s$, (measured from shaft centerline 201) when the rotating device is static and at room temperature.

Figure 3C:
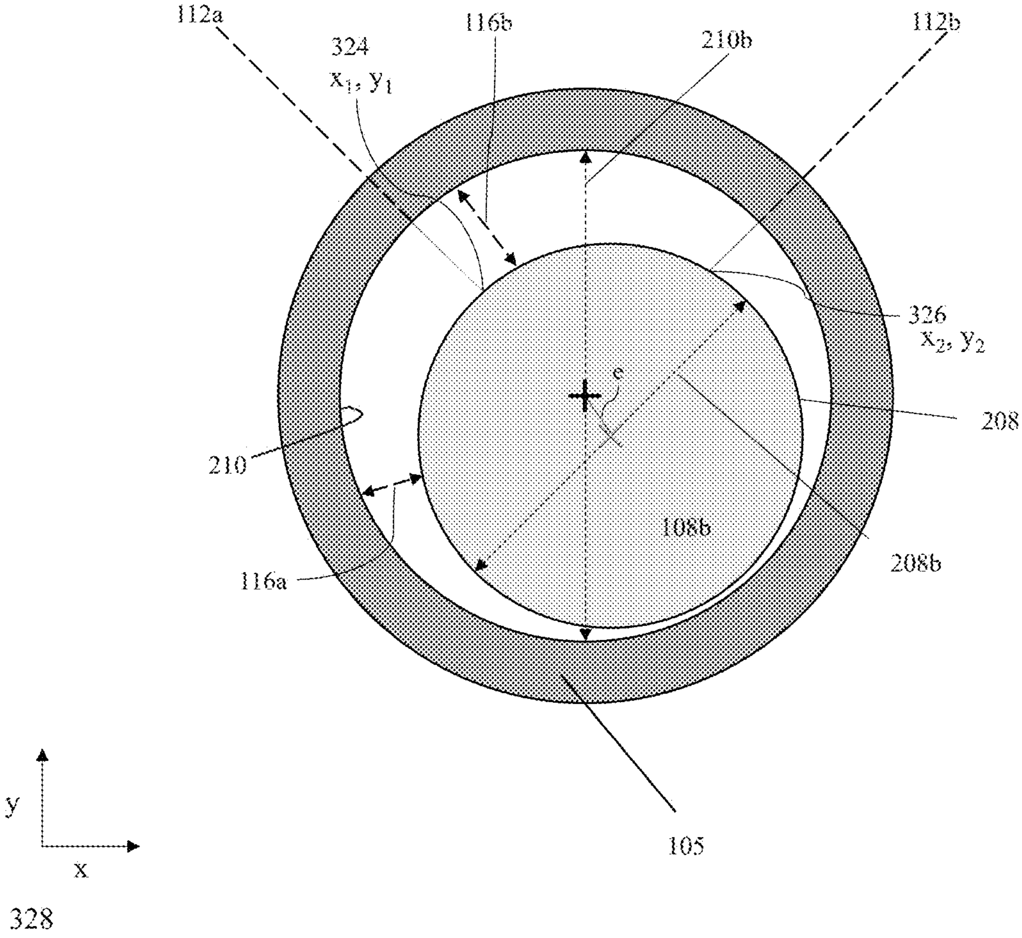
FIG. 3C is a front view of a rotating device illustrating an eccentric gap according to one or more embodiments.

Referring now to FIG. 3C, FIG. 3C shows a front view of a rotating device illustrating an operating eccentric gap 116*b* according to one or more embodiments. When the rotating apparatus is in operation (e.g., when the shaft is rotating), the shaft outer surface 208*b* may increase in diameter due to thermal expansion (as compared to atmospheric/non-operating conditions) and the position of the shaft within the process labyrinth may shift due to eccentricity leading to a displaced shaft 108*b*.

The displaced shaft 108*b* has an operating shaft outer diameter 208*b*, denoted by $d_s$, when the shaft is rotating and at an operating temperature. In one or more embodiments, the operating shaft outer diameter 208*b* ($d_s$) may be slightly larger than the static shaft outer radius 208*a* ($d_{s0}$) at static or room temperature conditions due to thermal expansion (from room temperature or another reference condition used to measure a known baseline to operating conditions). Methods according to one or more embodiments include acquiring temperature data with a temperature sensor in order to account for changes in shaft outer diameter due to thermal expansion and adjusting the static shaft outer diameter dso to an operating shaft outer diameter $d_s$ at a point in time during operation of the rotating apparatus. Accordingly, the operating shaft outer diameter 208*b* may be determined based on operating conditions using Equation 1 below:

$$d_s = d_{s0} + \Delta T * \alpha * d_{s0} \qquad \text{Equation 1}$$

where $d_s$ is the shaft outer diameter 208*b* at operating temperature, $d_{s0}$ is the shaft outer diameter 208*a* at a reference temperature, such as room temperature, ΔT is the change in temperature from the static (reference) condition to the operating condition, and α is the coefficient of thermal expansion of the shaft.

The labyrinth 105 has an operating labyrinth inner diameter 210*b*, denoted by $d_{seal}$, when the shaft is rotating. In one or more embodiments, the operating labyrinth inner diameter 210*b* ($d_{seal}$) may be slightly larger than the static labyrinth inner diameter 210*a* ($d_{seal}$, initial) at static or room temperature conditions due to thermal expansion (from room temperature or another reference condition used to measure a known baseline to operating conditions). Methods according to one or more embodiments include acquiring temperature data with a temperature sensor in order to account for changes in labyrinth inner diameter due to thermal expansion and adjusting the static labyrinth inner diameter $d_{seal}$, initial to an operating labyrinth inner diameter $d_{seal}$ at a point in time during operation of the rotating apparatus. Accordingly, the operating labyrinth inner diameter 210*b* may be determined based on the acquired operating conditions using Equation 2 below:

$$dR_{seal} = d_{seal,initial} - \Delta T * \alpha * d_{seal,initial} \quad \text{Equation 2}$$

where $d_{seal}$ is the labyrinth outer diameter 210*b* at operating temperature, $d_{seal}$, initial is the static labyrinth outer diameter 210*a* at a reference temperature, such as room temperature, ΔT is the change in temperature from the static (reference) condition to the operating condition, and α is the coefficient of thermal expansion of the labyrinth.

As would be understood by one of ordinary skill in the art, the coefficient of thermal expansion of the shaft and of the labyrinth are a material property which may be determined by any means known in the art.

In addition to thermal expansion causing a change in the shaft outer diameter and labyrinth inner diameter when the rotating apparatus is operating, the shaft may be displaced with respect to a central axis of the apparatus (e.g., labyrinth center 204, +), as described above. As shown in FIG. 3C, displaced shaft 108*b* has an off-center position, x, with respect to the labyrinth center 204. In one or more embodiments, a first position sensor 112*a* may be used to detect a first shaft position 324 of the displaced shaft 108*b*. The first shaft position has a position of $(x_1, y_1)$, where $(x_1, y_1)$ are coordinates on an xy-axis 328. Similarly, in one or more embodiments, a second position sensor 112*b* may be used to detect a second shaft position 326 of the displaced shaft 108*b*. The first shaft position has a position of $(x_2, y_2)$, where $(x_2, y_2)$ are coordinates on the xy-axis 328.

Methods according to one or more embodiments include acquiring the first shaft position 324 and the second shaft position 326 of the displaced shaft 108*b* from the first position sensor 112*a* and the second position sensor 112*b*, respectively. With a known operating shaft diameter, known placement of the position sensors, such as 90 degrees apart, and the measured positions $(x_1, y_1)$, $(x_2, y_2)$, the position $(x_3, y_3)$ of the shaft centerline 201 can be determined. Eccentricity is then calculated based on the direct measurement of the shaft centerline position provided by the displacement indicated by the position sensors. e=distance between the center of the rotating shaft (represented by '+' on FIG. 3C) and the center of the labyrinth (bearing) (represented by 'x' on FIG. 3C). The value 'e' may be readily calculated based on the position measurements provided by the position sensors, for example, where $e=(x_3^2+y_3^2)^{1/2}$, where the coordinate system sets x=0, y=0 as the centerline of the labyrinth.

$$c = (d_{seal} - d_s)/2$$

where c is the radial clearance between the bearing (labyrinth) inner surface, represented by $d_{seal}$, and the shafts outer surface, represented by $d_s$, at operating conditions.

$$E = e/c$$

where E is the eccentricity ratio (dimensionless) calculated by dividing the eccentricity e by the radial clearance c. The eccentricity ratio E is indicative of the relative amount of shaft displacement, ranging from 0 to 1. E is a value of zero at zero load and the shaft is centered within the labyrinth. E is a value of one when the shaft is at maximum displacement, potentially in contact with the labyrinth. The operating eccentric gap is a value of (e+c), the sum of the clearance c plus the offset distance e.

The displaced shaft 108*b* causes the gap between the labyrinth inner surface 210 and the shaft outer surface 208 to be a non-uniform radial gap 116*a* when viewed circumferentially around the apparatus. Consequently, there is a maximum radial gap distance between the labyrinth inner surface 210 and the shaft outer surface 208, defined as the operating eccentric gap 116*b*. Methods according to one or more embodiments further include determining, from the operating shaft position, the operating eccentric gap 116*b*. In one or more embodiments, the operating eccentric gap is defined as a maximum radial distance between the labyrinth inner surface and the shaft outer surface at a given point in time. Due to eccentricity and rotation during operation, the location and size of the operating eccentric gap within the labyrinth may change based on operating conditions, load, rotor speed, etc.

As briefly described above, the operating eccentric gap 116*b* results in a variable flow rate profile and a variable pressure drop profile of seal gas circumferentially around the non-uniform gap 116*a*. Because the operating eccentric gap 116*b* is defined by the largest distance between the labyrinth inner surface 210 and the shaft outer surface 208, the flow rate of seal gas flowing through the operating eccentric gap 116*b* and the pressure drop of seal gas flowing through the operating eccentric gap 116*b* are not constant circumferentially around the gap 116. Accordingly, adjusting the seal gas flow rate at the operating eccentric gap 116*b* is desirable to account for the circumferentially variable pressure drop and flow rate at the operating eccentric gap 116*b*. Methods according to one or more embodiments disclosed herein therefore also include determining, from the operating eccentric gap 116*b*, a desired seal gas flow rate using Equation 3 below:

$$Q = A_{gap} * v \quad \text{Equation 3}$$

where Q is the desired seal gas flowrate, $A_{gap}$ is the seal to shaft gap area based on measured eccentricity, and v is the velocity value based on operating speed measurement. The velocity value v is determined using Equation 4, below:

$$v = (v_0 - m * N^2) * u * E \quad \text{Equation 4}$$

$$N = \frac{\text{Measured Speed}}{\text{Maximum Speed}} \quad \text{Equation 4a}$$

where v is the calculated required velocity of the gas across the seal, $v_0$ is the default constant seal gas velocity, N is the speed ratio, E is the eccentricity ratio of the shaft centerline within the bearing/seal (as described above) measured using the position sensors, and m and u are coefficients correlating the seal gas velocity with the speed ratio and the eccentricity ratio, respectively. Further, $A_{gap}$ is determined using Equations 5-7 below:

$$A_{gap} = A_{seal} - A_{shaft} \quad \text{Equation 5}$$

$$A_{seal} = 0.25\pi d_{seal}^2 \quad \text{Equation 6}$$

$$A_{shaft} = 0.25\pi d_s^2 \quad \text{Equation 7}$$

where $A_{gap}$ is the seal gap area between the shaft and inner seal diameter, $A_{seal}$ is the seal area, $A_{shaft}$ is the shaft area, $d_{seal}$ is the labyrinth seal inner diameter 210*b* at operating temperature (accounting for thermal expansion), and $d_s$ is the shaft diameter 208*b* at operating temperature (accounting for thermal expansion.

The rotating apparatus of one or more embodiments may have a desired seal gas velocity. In one or more embodiments, the desired seal gas velocity is in a range of from about 2 m/s to about 5 m/s. For example, the desired seal gas velocity may be in a range having a lower limit of from about 2, 2.5, 3 or 3.5 m/s to an upper limit of about 4, 4.5, or 5 m/s, where any lower limit may be paired with any mathematically compatible upper limit.

Finally, methods disclosed in one or more embodiments include adjusting the operating seal gas flow rate, measured from the flow meter, to the desired seal gas flow rate as determined from Equation 3, above, by sending instructions via the distributed control system (DCS) to the flow control valve. Alternatively, methods disclosed herein may determine the desired seal gas flow rate based on the operating eccentric gap, thereby adjusting the flowrate based on the difference in the normal clearance (with matched centerlines) as compared to the maximum gap (operating eccentric gap) during operation, with simple adjustments in the math that arrive at the same desired flow rate (same result, different underlying calculations.

As would be understood by one of ordinary skill in the art, the operating shaft position will change constantly with respect to time during operation of the apparatus. Accordingly, the equations described above may be used to determine the operating shaft position, the operating eccentric gap, and the desired seal gas flow rate at a specific point in time during operation of the apparatus based on the acquired operating seal gas flow rate, first operating shaft position, second operating shaft position, and the operating shaft speed at the corresponding point in time during operation.

Furthermore, upon determining desired seal gas flow rate, the operating seal gas flow rate may be adjusted to the desired seal gas flow rate using the flow control valve at the corresponding point in time. The method may be repeated such that the operating seal gas flow rate may be adjusted to the desired seal gas flow rate using the flow control valve constantly in real time based on actual acquired sensor data.

Embodiments disclosed herein also relate to methods for controlling a seal gas. Methods for controlling a seal gas according to one or more embodiments include acquiring a seal gas control system, for example the seal gas control system shown and described in regard to FIG. 2, above.

Figure 4:
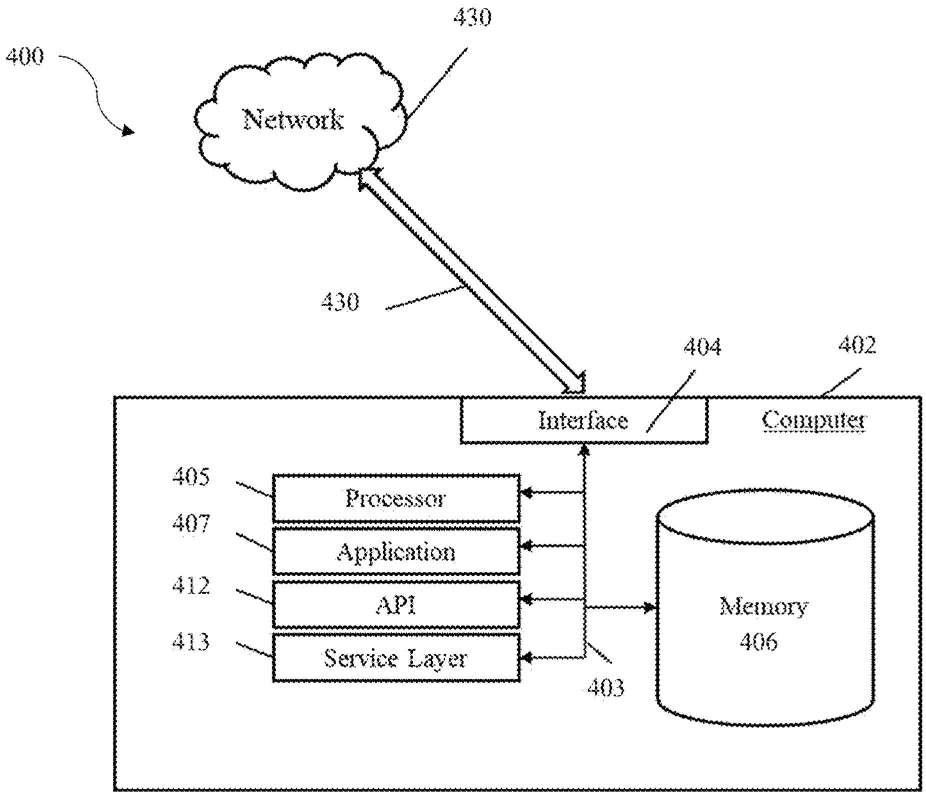
FIG. 4 is a computer system according to one or more embodiments.

FIG. 4 shows a computer system 400 in accordance with one or more embodiments. Specifically, FIG. 4 shows a block diagram of a computer 402 system used to provide computational functionalities associated with described algorithms, methods, functions, processes, flows, and procedures as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer 402 may include a computer that includes an input device, such as a keypad, keyboard, touch screen, or other device that can accept user information, and an output device that conveys information associated with the operation of the computer 402, including digital data, visual, or audio information (or a combination of information), or a GUI.

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413. The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402.

The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430. Generally, the interface 404 includes logic encoded in software or hardware (or a combination of software and hardware) and operable to communicate with the network 430. More specifically, the interface 404 may include software supporting one or more communication protocols associated with communications such that the network 430 or interface's hardware is operable to communicate physical signals within and outside of the illustrated computer 402.

The computer 402 includes at least one computer processor 405. Although illustrated as a single computer processor 405 in FIG. 4, two or more processors may be used according to particular needs, desires, or particular implementations of the computer 402. Generally, the computer processor 405 executes instructions and manipulates data to perform the operations of the computer 402 and any algorithms, methods, functions, processes, flows, and procedures as described in the instant disclosure.

The computer 402 also includes a non-transitory computer 402 readable medium, or a memory 406, that holds data for the computer 402 or other components (or a combination of both) that can be connected to the network 430. For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Embodiments disclosed herein may include at least one of the following advantages.

Systems and methods according to one or more embodiments may help to ensure reliability in the speed-based variation of seal gas flow in compressors fitted with dry gas seals during transient operations such as startup and shut down.

Prior art methods maintain constant seal gas flow velocity during off-design conditions, resulting in contaminants entering critical seal components and causing premature seal failure. Methods disclosed herein help to prevent dirty/contaminated process gas migration to the dry gas seal at all speeds while covering the entire operating range of the compressor including startup and shutdown transient conditions.

Systems and methods according to one or more embodiments do not rely on use of a choking mechanism that limits the maximum seal gas flowrate, as some prior art methods do.

Seal gas flow rate or pressure may advantageously be adapted using methods disclosed herein based on physical machine operating conditions such as speed, clearance, or shaft position.

Systems and methods disclosed herein may help reduce the amount of seal gas consumed since flow rates are more precisely calculated compared to prior art methods.

Example

The following Example is provided for the purpose of further illustrating the present inventions and is in no way intended to be limiting.

In one embodiment, based on API 617 and API 692 for Beam type centrifugal compressors seal system design, the below is an example quantified solution for the above method.

$$v = (v_0 - m * N^2) * u * E \qquad \text{Equation 4}$$

$$N = \frac{\text{Measured Speed}}{\text{Maximum Speed}}$$

$v_0$=2 m/s as per API 692 minimum required seal gas velocity $$u = 15 \text{ m/s}$$

$$m = -4.67 \text{ m/s}$$

at full speed, N=1 and E=0.5, therefore v=5 m/s which is in accordance with API 692 requirements. Values may be similarly calculated at other speeds, and the seal gas flow adjusted accordingly.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A method to control a flow of a seal gas through a dry gas seal, comprising:

acquiring a seal gas control system, comprising:

a rotating apparatus, the rotating apparatus comprising:

a process labyrinth, having a labyrinth inner surface and a labyrinth inner radius, a shaft, having a shaft outer surface and a shaft outer radius, disposed within the process labyrinth and configured to rotate within the process labyrinth at a shaft speed in a range from zero up to a maximum shaft speed, a first shaft position sensor located proximate the shaft and configured to measure a first shaft position, a second shaft position sensor located proximate the shaft and configured to measure a second shaft position, a shaft speed sensor located proximate the shaft and configured to measure the shaft speed, and a gap having a gap size defined by a radial distance between the labyrinth inner surface and the shaft outer surface;

a gas supply system fluidly connected to the rotating apparatus and configured to provide the seal gas to the gap via a seal gas line; and a gas flow control system comprising a flow control valve and a flow meter disposed on the seal gas line, wherein the flow meter is configured to measure a seal gas flow rate;

receiving an operating seal gas flow rate from the flow meter;

receiving an operating shaft speed from the shaft speed sensor;

receiving a first operating shaft position from the first shaft position sensor and a second operating shaft position from the second shaft position sensor;

determining an operating shaft position of the shaft within the process labyrinth from the first operating shaft position and the second operating shaft position at a point in time during operation of the rotating apparatus;

determining a desired seal gas flow rate as a function of the operating shaft position; and adjusting the operating seal gas flow rate to the desired seal gas flow rate using the flow control valve.

2. The method of claim 1, wherein adjusting the operating seal gas flow rate comprises automatically adjusting, by the seal gas control system, a position of the flow control valve.

3. The method of claim 1, further comprising determining an operating eccentric gap from the operating shaft position, wherein the operating eccentric gap is a maximum radial distance between the labyrinth inner surface and the shaft outer surface at the point in time during operation of the rotating apparatus.

4. The method of claim 3, wherein the desired seal gas flow rate is calculated based on a value of the operating eccentric gap.

5. The method of claim 1, wherein the second shaft position sensor is disposed radially at a 90 degree angle from the first shaft position sensor.

6. The method of claim 1, wherein the computer system is further configured to determine an operating labyrinth inner diameter and an operating shaft outer diameter based on an operating temperature of the rotating equipment.

7. The method of claim 6, wherein the desired seal gas flow rate is calculated based on an eccentricity ratio calculated at the operating temperature of the rotating equipment.

8. The method of claim 1, wherein the method is repeated such that the operating seal gas flow rate is continuously adjusted to the desired seal gas flow rate using the flow control valve in real-time.

9. A system to control a flow of a seal gas through a dry gas seal, comprising:

a rotating apparatus, the rotating apparatus comprising;

a process labyrinth, having a labyrinth inner surface and a labyrinth inner radius, a shaft, having a shaft outer surface and a shaft outer radius, disposed within the process labyrinth and configured to rotate within the process labyrinth at a shaft speed, a first shaft position sensor located proximate the shaft and configured to measure a first shaft position, a second shaft position sensor located proximate the shaft and configured to measure a second shaft position, wherein the second shaft position sensor is disposed radially at a 90 degree angle from the first shaft position sensor, a shaft speed sensor located proximate the shaft and configured to measure the shaft speed, and a gap having a gap size defined by a radial distance between the labyrinth inner surface and the shaft outer surface;

a gas supply system fluidly connected to the rotating apparatus and configured to provide the seal gas to the gap via a seal gas line;

a gas flow control system comprising a flow control valve and a flow meter disposed on the seal gas line, wherein the flow meter is configured to measure a seal gas flow rate; and a computer system coupled to the at least one shaft position sensor, the shaft speed sensor, the gas supply system, and the gas flow control system, wherein the computer system is configured to:

receive an operating seal gas flow rate from the flow meter;

receive an operating shaft speed from the shaft speed sensor;

receive a first operating shaft position from the first shaft position sensor and a second operating shaft position from the second shaft position sensor;

determine an operating shaft position of the shaft within the process labyrinth from the first operating shaft position and the second operating shaft position at a point in time during operation of the rotating apparatus;

determine a desired seal gas flow rate as a function of the operating shaft position; and adjust the operating seal gas flow rate to the desired seal gas flow rate using the flow control valve.

10. The system of claim 9, wherein:

the system further comprises a temperature sensor to measure a temperature of the rotating equipment; and the computer system is further configured to determine an operating labyrinth inner radius and an operating shaft outer radius based on a temperature of the rotating equipment measured by the temperature sensor.

11. The system of claim 10, wherein the computer system is further configured to determine an eccentricity based on the first operating shaft position, the second operating shaft position, and the operating shaft outer radius.

12. The system of claim 11, wherein the desired seal gas flow rate is determined as a function of the eccentricity.

13. The system of claim 10, wherein the computer system is further configured to determine an operating eccentric gap from the operating shaft position, wherein the operating eccentric gap is a maximum radial distance between the labyrinth inner surface and the shaft outer surface at the point in time during operation of the rotating apparatus.

14. A method to control a flow of a seal gas through a dry gas seal, comprising:

acquiring a seal gas control system, comprising:

a rotating apparatus, the rotating apparatus comprising:

a process labyrinth, having a labyrinth inner surface and a labyrinth inner radius, a shaft, having a shaft outer surface and a shaft outer radius, disposed within the process labyrinth and configured to rotate within the process labyrinth at a shaft speed in a range from zero up to a maximum shaft speed, a first shaft position sensor located proximate the shaft and configured to measure a first shaft position, a second shaft position sensor located proximate the shaft and configured to measure a second shaft position, a shaft speed sensor located proximate the shaft and configured to measure the shaft speed, and a gap having a gap size defined by a radial distance between the labyrinth inner surface and the shaft outer surface;

a gas supply system fluidly connected to the rotating apparatus and configured to provide the seal gas to the gap via a seal gas line; and a gas flow control system comprising a flow control valve and a flow meter disposed on the seal gas line, wherein the flow meter is configured to measure a seal gas flow rate;

receiving an operating seal gas flow rate from the flow meter;

receiving an operating shaft speed from the shaft speed sensor;

receiving a first operating shaft position from the first shaft position sensor and a second operating shaft position from the second shaft position sensor;

determining an operating shaft position of the shaft within the process labyrinth from the first operating shaft position and the second operating shaft position at a point in time during operation of the rotating apparatus;

determining an operating eccentric gap from the operating shaft position, wherein the operating eccentric gap is a maximum radial distance between the labyrinth inner surface and the shaft outer surface at the point in time during operation of the rotating apparatus;

determining a desired seal gas flow rate as a function of the operating shaft position, wherein the desired seal gas flow rate is calculated based on a value of the operating eccentric gap; and adjusting the operating seal gas flow rate to the desired seal gas flow rate using the flow control valve.

* * * * *